Nov. 9, 1948.             C. P. SWEENY                2,453,680
             SPEED AND FREQUENCY CONTROL APPARATUS
             FOR RADIO FREQUENCY BONDING SYSTEMS
                    Filed Dec. 7, 1944
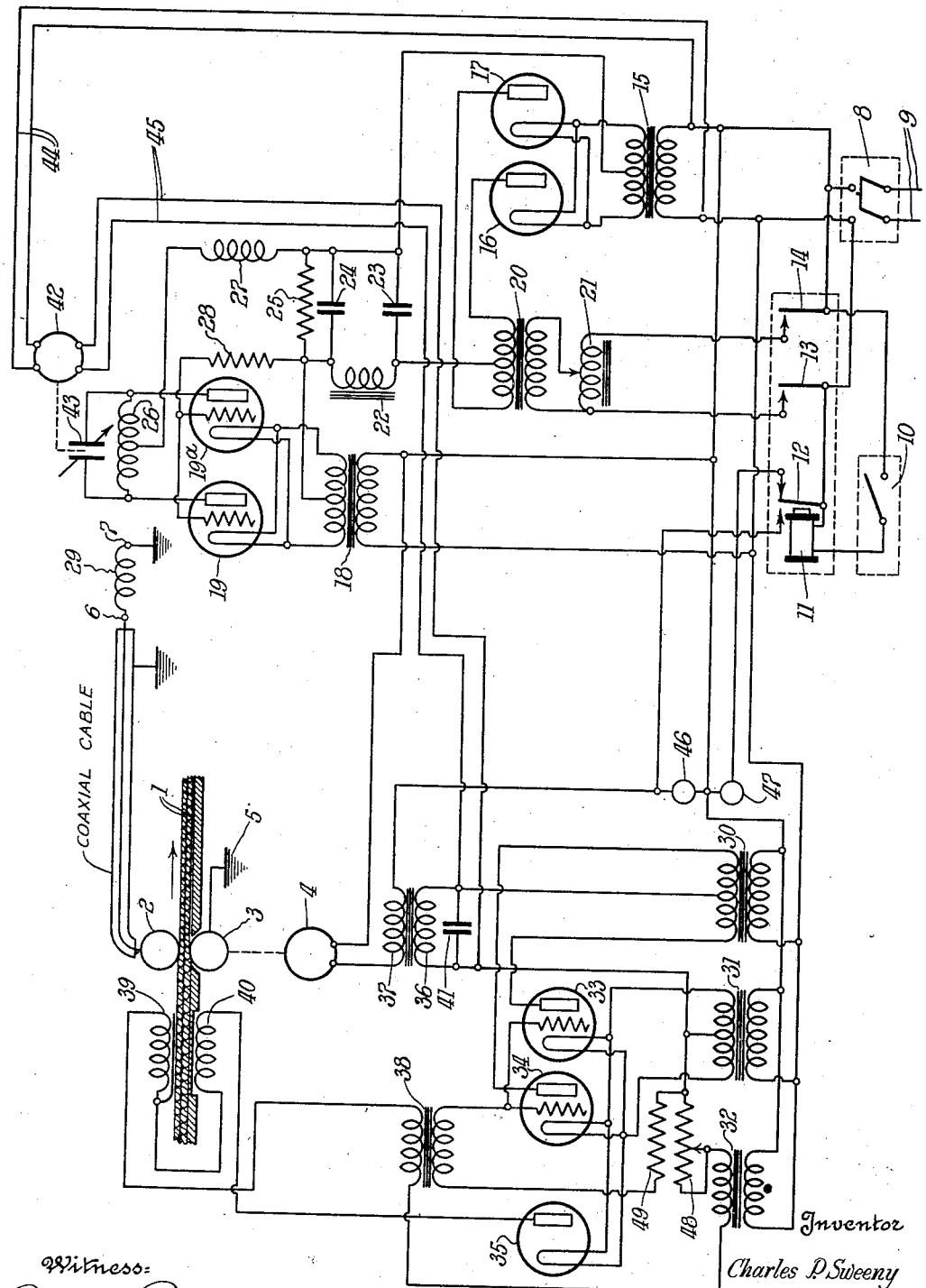
Witness:
Godfrey Pecina
Inventor
Charles P. Sweeny
By William P. Stewart
     Attorney Patented Nov. 9, 1948

2,453,680

UNITED STATES PATENT OFFICE 2,453,680

SPEED AND FREQUENCY CONTROL APPARATUS FOR RADIO-FREQUENCY BONDING SYSTEMS

Charles P. Sweeny, Somerville, N. J., assignor to The Singer Manufacturing Company, Elizabeth, N. J., a corporation of New Jersey Application December 7, 1944, Serial No. 567,106

10 Claims. (Cl. 219—47)

This invention relates to apparatus for bonding materials by means of heat and pressure, the former being generated as dielectric or electronic heat as the material to be bonded is passed through an alternating electric field of high frequency. Plastics generally are known to be susceptible to bonding, or "welding" as it is sometimes called, by such methods. Such materials, covering a wide range of products commonly known by trade-names, are referred to for convenience herein as bondable materials. Their important common characteristic so far as the present invention is concerned is that of softening when subjected to a suitable high frequency field so that applied pressure causes them to unite with neighboring materials, of a like character or otherwise, as the particular application may require, and upon rehardening to form a permanent bond or weld. The term "electric field," as employed in this specification, shall be understood to define that field which exists between conducting electrodes across which is impressed an alternating voltage.

The principal object of the present invention is to provide an improved apparatus for this purpose adapted to insure a satisfactory, substantially uniform and preferably continuous bond, as for example between layers of sheet stock, regardless of the variations, particularly in thickness, which are found in bondable material as commercially available and which may be present by reason of cross seams, etc.

With the above and other objects in view, as will hereinafter appear, the invention comprises the devices, combinations and arrangements of parts hereinafter set forth and illustrated in the accompanying drawing which diagrammatically illustrates a preferred embodiment of the invention, from which the several features of the invention and the advantages attained thereby will be readily understood by those skilled in the art.

The bondable material is indicated as comprising two superimposed sheets 1 adapted to be fed between suitable electrodes, such as rollers 2 and 3, which, or one of which, as the roller 3, is driven by an adjustable speed feed motor 4. The rollers are biased toward one another by any suitable means, not shown. The spacing of the rollers, determined by the thickness of the material between them, represents the gap in which a high-frequency alternating-current field is established to heat the material, as will be understood.

For present purposes the rollers 2 and 3 can be assumed to be of suitable conducting material, one of them, say the roller 3, grounded at 5, and the roller 2 suitably connected, as by a coaxial cable, with one of the output terminals 6 of a high-frequency alternating-current source. The other output terminal 7 is also grounded. For the purpose of illustration, the high-frequency source is shown as comprising an electron discharge tube oscillator of a well-known push-pull type.

The illustrated circuit is controlled by two switches: a main switch 8, which controls the input from a source 9, of single-phase alternating current, and what may be termed a work-switch 10 which is manipulated by the operator from time to time to start and stop the feed motor 4 and, coincidently, to control the oscillator. The work-switch operates through relay 11 to control switches 12, 13 and 14.

Closure of work-switch 10, through relay 11, closes control switch 12 energizing the feed motor 4 from the source 9 through a winding 37 of a motor speed control reactor, the function of which will be later described in detail.

The oscillator control circuit will be recognized as conventional, and operates as follows: When the main switch 8 is closed, the transformer 15 is energized, heating the filaments of rectifier tubes 16, 17. Also, transformer 18 is energized, heating the filaments of the oscillator tubes 19 and 19$^a$. Closure of work-switch 10, through relay 11, closes switches 13 and 14, energizing transformer 20 through adjustable transformer 21; thereby applying excitation to rectifier tubes 16 and 17 which supply D. C. power to oscillator tubes 19 and 19$^a$.

A conventional pi-type filter circuit comprising a smothing choke 22 and condensers 23, 24, provides a means of smoothing the D. C. voltage supplied by the rectifier to the plates of oscillator tubes 19 and 19$^a$. This D. C. voltage appears across a bleeder resistor 25 and the positive side is applied to the mid-point of the plate tank coil 26 through a high-frequency choke coil 27. The negative side of the D. C. voltage is applied to the mid-point of the secondary of the filament transformer 18. A grid leak resistor 28 provides the bias voltage for the grids of tubes 19 and 19$^a$ in a manner well known in the art.

The oscillator tubes 19 and 19$^a$ are then delivering to the tank coil 26 high-frequency A. C. power which is induced into the secondary coil 29 and thence to terminals 6 and 7 thereof. This high-frequency power is transferred from the terminals 6 and 7 to the rollers 2 and 3 by means of the coaxial cable to avoid unnecessary dissipation and loss thereof between the oscillator and the field gap, as is well known.

Thus, as a result of the closure of switch 10, the oscillator is delivering high-frequency A. C. power to the rollers 2 and 3, the motor 4 is running, and bondable material is being fed through the machine between rollers 2 and 3. As will be understood, the power output of the oscillator is controlled by varying the plate voltage thereof by means of adjustable transformer 21 which may be manually preadjusted to supply the power output appropriate to the particular material being bonded, its thickness, and its linear rate of feed.

So organized, the apparatus has been found to be unsatisfactory in many instances, especially when high speed bonding is attempted and particularly as to the uniformity of the bond throughout any given stretch of the material. It has been discovered that this lack of uniformity is largely attributable to variations in the thickness of the bondable material, which variations may be slight and superficially insignificant, i. e. thickness variations of the order of half a thousandth of an inch or less. It has also been discovered that a highly satisfactory bond can be achieved by varying the feed motor speed, and hence the rate of feed, in accordance with such thickness variations of the material—actually, inversely as the thickness varies, so that the greater the thickness the lower the motor speed, and the less the thickness the higher the motor speed. A preferred and highly effective system for so controlling the feed motor speed will now be described.

In the line circuit controlled by main switch 8 are transformers 30, 31 and 32 by which tubes 33, 34 and 35 are energized. Tubes 33 and 34 comprise a full-wave rectifier the output of which is connected to the D. C. winding 36 of a motor speed control reactor having an A. C. winding 37 incorporated in the circuit of feed motor 4. As will be understood, the feed motor speed, which is substantially proportional to the voltage applied, will vary inversely as the impedance manifested in the A. C. coil of the reactor; the impedance, in turn varying inversely as the current flow in the D. C. coil of the reactor.

Tube 35 is a half-wave rectifier inductively coupled by transformer 38 to the grids of tubes 33 and 34; the plate circuit of tube 35 comprising two series-connected coils 39, 40 having opposing inductive fields and mounted for relative movement to establish a variable reluctance gap.

The particular manner of mounting and relatively moving the coils 39 and 40 forms no part of the present invention, it being sufficient for present purposes to state that one of the coils, say, the lower coil 40, may be stationary and the upper coil moved up or down as the thickness of the bondable material increases or decreases. Any suitable means may be utilized for "feeling" and multiplying the thickness variations of the material as it is advanced through the rollers 2 and 3 and adjusting the position of coil 39 accordingly, thereby varying the reluctance gap established by coils 39, 40. Thus varying the reluctance gap introduces a variable impedance in the plate circuit of tube 35, resulting in varying the output voltage across the transformer 38. In the result, the voltage applied to the grids of tubes 33, 34 will vary, permitting more or less plate current to flow and hence more or less current to flow in the D. C. coil 36 of the motor speed control reactor. A capacitor 41 is connected across the coil 36 to absorb any A. C. voltage surges which may be induced from the coil 37 and its connected circuit.

In order to preadjust the input voltage impressed on transformer 38, a series-connected adjustable resistor 48 is employed and is manually preset to obtain satisfactory bonding at some desired base speed with material of a given base thickness. It is about said base speed that the actual speed will vary depending on the relative positions of coils 39 and 40 as above explained. Resistor 49 limits the grid currents for rectifier tubes 33 and 34.

By means of the foregoing, the motor speed, and hence the rate of feed of the bonding material through the high-frequency field gap, is closely controlled by the thickness of the material, the controls functioning to vary the feed motor speed inversely as the material thickness varies; and in large part the difficulties heretofore experienced in effecting continuously uniform and satisfactory bonding, at high speed and without undue power loss, are eliminated.

It has also been discovered, however, that still better results are obtainable in the particulars mentioned if provision is made to vary the frequency of the oscillator power responsively to changes in the thickness of the material in order to insure constancy of power output at the high frequency field gap. In this connection, it appears that to obtain the highest degree of overall efficiency, the oscillator frequency is required to be changed as the material variations bring about changes in the load capacitance and in the rate of feed, and, in accordance with the present invention, means are provided for effecting such a frequency change quite automatically and with only slight addition to the circuit already described.

In the preferred system illustrated, the control of the oscillator frequency is accomplished by a two-phase torque motor 42 operating a variable tuning condenser 43 connected across the plate tank coil 26 of the oscillator as shown. It is well known that the output frequency of this type of oscillator is determined by the electrical constants of the tank circuit. Thus, the oscillator output frequency may be controlled by controlling the setting of condenser 43.

One winding of the motor 42 is connected by leads 44 to the A. C. line 9 through the main switch 8. This is the reference phase and is maintained continuously excited while the main switch 8 is closed. The other winding of the motor 42 is connected by leads 45 across the D. C. winding 36 of the motor speed control reactor and is subject to the variations in the D. C. from the full-wave rectifier responsive to changes in the thickness of the material as explained above in connection with the feed control.

It has been found that, at a certain base voltage delivered by the full-wave rectifier to the motor 42, corresponding to a definite predetermined base thickness of material to be bonded, the rotor of said motor will stand still. Further, as the D. C. voltage delivered by said rectifier to the motor 42 is raised above and lowered below the base voltage value, responsive to a decrease and an increase respectively, in the thickness of the material relative to a base thickness, the rotor will rotate in opposite directions for opposite changes in voltage and thickness. It has been found that, within limits, the amount of positional change of the rotor of motor 42 is substantially proportional to the amount of the voltage change. Thus, by proper design of the circuit constants, it may be brought about that, for a given change in thickness of bondable material, the correct magnitude of D. C. voltage is applied to the motor 42 to drive the tuning condenser 43 to a position such that the oscillator frequency is suited to the load impedance. That is to say, the oscillator power frequency is continuously being adjusted so that it will always be substantially the resonant frequency for the load impedance, including the transmission line, regardless of variations in said impedance.

Thus, as the reluctance gap of coils 39, 40 varies, responsive to variation in thickness of the bondable material, so the motor 42 changes its rotor position and, with it, the position of the variable condenser 43 which in turn variably adjusts the frequency of the oscillator output sufficiently to effect equally good bonding regardless of variations in thickness and thus to provide a uniformly strong seam.

The indicator lamps 46 and 47 are provided for indicating, at any desired location, whether the oscillator is turned on or off. Under the circuit conditions shown in the figure, lamp 46 is extinguished and lamp 47 is turned on. It is seen that, when the relay 11 is picked up by operation of the work-switch 10 to turn on the oscillator, lamp 47 is extinguished and lamp 46 is turned on.

From the foregoing it will be perceived that I provide an improved apparatus for bonding plastic materials by the application of high-frequency A. C. fields including automatic control means for coincidental control of the feed of the bondable material and the frequency of the oscillator power output responsive to variations in the thickness of said materials.

Having thus set forth the nature of the invention, what I claim herein is:

1. In an apparatus of the character described, means for heating thermoplastic sheet material of varying combined thickness, comprising, means for establishing a high-frequency electric field, means for passing the sheet material in superimposed relation through said field, means for sensing the thickness variations in said material in advance of said field, and means for varying the frequency of said field in accordance with the sensed variations in the thickness of the sheet materials.

2. In an apparatus of the character described, an adjustable speed motor, speed controlling circuits therefor including a full-wave rectifier, a half-wave rectifier for controlling the output thereof, and means for introducing a variable impedance in the plate circuit of the half-wave rectifier, said means including relatively movable, opposed-field coils establishing a reluctance gap, and means for varying said gap.

3. In an apparatus of the character described, an adjustable speed motor, a motor speed control reactor in circuit with the motor, a full-wave rectifier controlling the current flow to the direct current winding of the reactor, a half-wave rectifier for controlling the output of the full-wave rectifier, and means for introducing a variable impedance in the plate circuit of the half-wave rectifier, said means including relatively movable, opposed-field coils establishing a reluctance gap, and means for varying said gap.

4. In a bonding apparatus, in combination, an oscillator, spaced electrodes connected to said oscillator providing a high frequency electric field, means for feeding bondable material through said field, a tuned tank circuit for said oscillator, means for sensing the thickness variations of said material in advance of the electric field, an electric motor, and means responsive to said sensed variations for controlling said motor for varying the tuning of said tank circuit, whereby the frequency of said field is varied.

5. In an apparatus of the character described, a torque motor, position-controlling circuits therefor including a full-wave rectifier, a half-wave rectifier for controlling the output thereof, and means for introducing a variable impedance in the plate circuit of the half-wave rectifier, said means including relatively movable, opposed field coils establishing a reluctance gap, and means for varying said gap.

6. In an apparatus of the character described, an oscillator, spaced electrodes, means for transmitting the oscillator output to said electrodes to provide a high-frequency electric field gap, an adjustable speed motor, means driven thereby for feeding bondable material through said gap, means for sensing thickness variations in said material in advance of said gap, and means for coincidently varying both the motor speed and the frequency of the oscillator responsive to said sensed variations.

7. In an apparatus of the character described, an oscillator, spaced electrodes, means for transmitting the oscillator output to said electrodes to provide a high-frequency electric field gap, an adjustable speed motor, means driven thereby for feeding varying-thickness bondable material through said gap, means for sensing thickness changes in said material in advance of said gap, motor speed control means, oscillator frequency control means, and means responsive to the sensed material thickness changes adapted to control both said control means.

8. In an apparatus of the character described, an oscillator, spaced electrodes, means for transmitting the oscillator power output to said electrodes to provide a high-frequency electric field gap, an adjustable speed motor, means driven thereby for feeding bondable material of varying thickness through said gap, means for sensing thickness variations in said material in advance of said gap, means for varying the motor speed, and means for changing the frequency of the oscillator, said last two means being conjointly responsive to said sensed variations in the material thickness.

9. In an apparatus of the character described, an oscillator, spaced electrodes, means for transmitting the oscillator power output to said electrodes to provide a high-frequency electric field, an adjustable speed motor, means driven thereby for feeding bondable material of varying thickness through said field, means for sensing said variations in material thickness in advance of said field, and conjoint means for varying the motor speed and for adjusting the frequency of the oscillator in response to said sensed variations in the material thickness.

10. In an apparatus of the character described, feeding means for advancing bondable material of varying thickness continuously through a high-frequency electric field of wattage and base frequency predetermined in accordance with the base thickness of the material and the base speed at which it is advanced, means for continuously sensing the thickness of said bondable material at a single point in advance of the field, separate motor means, means for transforming the thickness variations so sensed into corresponding impedance variations to control the power flow to said separate motor means for simultaneously varying the speed of advance inversely about said base speed and the frequency of said field directly about said base frequency as the thickness of the material varies about said base thickness.

CHARLES P. SWEENY.

REFERENCES CITED

The following references are of record in the file of this patent:

UNITED STATES PATENTS

| Number | Name | Date |
|---|---|---|
| 1,969,536 | Winne | Aug. 7, 1934 |
| 2,055,941 | Newhouse | Sept. 29, 1936 |
| 2,147,689 | Chaffee | Feb. 21, 1939 |
| 2,251,277 | Hart | Aug. 5, 1941 |
| 2,304,958 | Rouy | Dec. 15, 1942 |
| 2,391,086 | Crandell | Dec. 18, 1945 |
| 2,396,004 | Gilbert | Mar. 5, 1946 |

OTHER REFERENCES

Hoyler, "An Electronic 'Sewing Machine,'" Electronics, August, 1943, pages 90–93, 160, 162, 164, 166 and 168, particularly pages 92 and 93. (Copy in Sci. Lib.; reprint in Division 60.)

Zade, "Welding Thermoplastics With High Frequency," Plastics, September, 1944, pages 30, 32, 95 and 96, particularly pages 30 and 32. (Copy in Scientific Library.)

Batcher et al., "The Electronic Engineering Handbook," 1944 (preface dated March 1944), pages 343, 345 and 367. Electronic Development Associates, 125 East 46th Street, New York 17, N. Y. (Copy in Div. 60.)